(12) United States Patent
Matsuda et al.

(10) Patent No.: US 11,582,399 B2
(45) Date of Patent: Feb. 14, 2023

(54) ADAPTIVE SAMPLING FOR STRUCTURED LIGHT SCANNING

(71) Applicant: Northwestern University, Evanston, IL (US)

(72) Inventors: Nathan S. Matsuda, Evanston, IL (US); Oliver Strider Cossairt, Evanston, IL (US); Jesse Chang, Granada Hills, CA (US); Christopher Gezon, Wilmette, IL (US)

(73) Assignee: Northwestern University, Evanston, IL (US)

( * ) Notice: Subject to any disclaimer, the term of this patent is extended or adjusted under 35 U.S.C. 154(b) by 108 days.

(21) Appl. No.: 16/978,956

(22) PCT Filed: Mar. 7, 2019

(86) PCT No.: PCT/US2019/021089
§ 371 (c)(1),
(2) Date: Sep. 8, 2020

(87) PCT Pub. No.: WO2019/173556
PCT Pub. Date: Sep. 12, 2019

(65) Prior Publication Data
US 2020/0412933 A1    Dec. 31, 2020

Related U.S. Application Data

(60) Provisional application No. 62/641,043, filed on Mar. 9, 2018.

(51) Int. Cl.
*G06T 15/06* (2011.01)
*H04N 5/235* (2006.01)
(Continued)

(52) U.S. Cl.
CPC ......... *H04N 5/2354* (2013.01); *G06T 15/005* (2013.01); *G06T 15/06* (2013.01);
(Continued)

(58) Field of Classification Search
CPC ....... G06T 15/06; G06T 15/506; G06T 15/50; G06T 2207/10028; G06T 15/20;
(Continued)

(56) References Cited

U.S. PATENT DOCUMENTS 8,988,449 B2    3/2015   Sasaki et al.
9,448,059 B2    9/2016   Bridges et al.
(Continued)

FOREIGN PATENT DOCUMENTS

WO    WO 2012/021443 A2    2/2012

OTHER PUBLICATIONS

The International Search Report and Written Opinion issued in International Patent Application No. PCT/US2019/021089 dated Jun. 20, 2019, pp. 1-8.

*Primary Examiner* — Hau H Nguyen
(74) *Attorney, Agent, or Firm* — Bell & Manning, LLC (57) ABSTRACT

A system to process images includes a light source configured to emit a first illumination pattern onto one or more first portions of a scene. The system also includes an image sensor configured to capture light reflected from the scene in response to the emitted first illumination pattern. The system also includes an optimizer configured to perform raytracing of the light reflected from the scene. The system further includes a processor operatively coupled to the optimizer. The processor is configured to determine a parameter of a surface of the scene based on the raytracing, cause the light source to emit a second illumination pattern onto one or more second portions of the scene based at least in part on the parameter of the surface, and refine the parameter of the (Continued)

surface of the scene based on additional raytracing performed on reflected light from the second illumination pattern.

18 Claims, 9 Drawing Sheets (51) Int. Cl.
    *H04N 5/232*     (2006.01)
    *G06T 15/00*     (2011.01)
    *G06T 15/50*     (2011.01)
    *H04N 5/225*     (2006.01)

(52) U.S. Cl.
    CPC ......... *G06T 15/506* (2013.01); *H04N 5/2256* (2013.01); *H04N 5/232411* (2018.08)

(58) Field of Classification Search
    CPC ........... G06T 7/70; G06T 15/60; G06T 7/521; G06T 7/50; H04N 5/2256; H04N 5/2354; H04N 13/128
    See application file for complete search history.

(56)     References Cited

U.S. PATENT DOCUMENTS

| | | |
|---|---|---|
| 9,557,630 B1 | 1/2017 | Marason et al. |
| 2012/0207404 A1* | 8/2012 | Robles-Kelly .......... G06T 7/586 |
| | | 382/286 |
| 2016/0080726 A1* | 3/2016 | Rangarajan ........ G01B 11/2513 |
| | | 348/46 |
| 2017/0372508 A1* | 12/2017 | Schoeneman ........... G06T 15/06 |
| 2018/0061034 A1* | 3/2018 | Zhao ....................... G06T 7/521 |
| 2018/0365886 A1* | 12/2018 | Martins Sena ....... G06T 15/506 |

* cited by examiner

Fig. 1

| Configuration | s | k | $f_o$ | K | G |
|---|---|---|---|---|---|
| Structured Light Scanning | Unknown | Uniform | Fixed | Lambertian | 1st Bounce |
| Light Transport Aware Structured Light Scanning | Unknown | Uniform | Fixed | Lambertian | Monte Carlo |
| Adaptive Light Transport Aware Structured Light Scanning | Unknown | Uniform | Pre-calculated | Lambertian | Monte Carlo |

Algorithm 1 Gradient Descent Routine

1: $T \leftarrow \Gamma$
2: $S \leftarrow \text{Reproject}(\hat{I})$
3: for $e \in \text{Epochs}$ do
4:     $\text{current} \leftarrow T(S)$
5:     for $s_k \in S$ do
6:         $\text{offset} \leftarrow T(S + \delta(s_k))$
7:         $\text{gradient}[s_k] \leftarrow \|\hat{I} - \text{current}\|_2^2 - \|\hat{I} - \text{offset}\|_2^2$
8:     end for
9:     $S \leftarrow S + \text{gradient}$
10: end for
11: return $S$

Fig. 8

ADAPTIVE SAMPLING FOR STRUCTURED LIGHT SCANNING

CROSS-REFERENCE TO RELATED APPLICATION

This application is a National Stage of International Application No. PCT/US19/21089, filed Mar. 7, 2019, which claims the benefit of U.S. Patent Application No. 62/641,043, filed Mar. 9, 2018, the contents of which are herein incorporated by reference.

BACKGROUND

Rendering, or image synthesis, refers to the process of generating an image from one or more models or scenes using computing techniques. Many computing systems include graphics processing units (GPUs) to assist with rendering. Traditional rendering techniques include rasterization, scanline rendering, etc. Computer graphics researchers have developed rendering techniques following a path towards physical accuracy, while balancing computing limitations of the time. Early models applied simple linear combinations of specular and diffuse components without any consideration for higher order light transport.

Increasingly widespread use of desktop computers for video gaming and media production has driven the development of graphics-specific acceleration hardware. At first these devices were sequential pipelines of fixed operations like visibility testing, shading, and rasterization. Modern day graphics accelerators, i.e., GPUs, are flexible enough to be used as general purpose computing devices. Their key feature is highly parallel computation, with thousands of compute cores even in inexpensive consumer models.

SUMMARY

As imaging hardware increases in speed and resolution, spurred by the growth of consumer cameras and projection systems, the problem sizes associated with computational imaging system optimization can become intractable. The subject matter described herein presents solutions to a large optimization problem in the form of depth recovery from a structured light scanning architecture. As discussed in more detail below, highly parallel raytracing models running on GPU hardware are utilized to overcome otherwise infeasible problem sizes.

The subject matter described herein relates generally to improved real-time rendering in high-resolution computational cameras and projector systems. More specifically, the present application discloses systems and methods for dynamically adjusting where and when light from a light source is pointed within a field of view to improve imaging quality, speed, and/or power consumption when rendering an area of interest within a scene.

More specifically, the proposed methods and systems dynamically adjust the field of view and imaging quality by using light steering mechanisms to direct a light source towards areas of interest within a scene. In contrast to conventional imaging sensors with active illumination that either illuminates the entire scene or displays a fixed pattern or raster, illumination in the proposed methods and systems is directly controlled to maximize its efficiency.

Looking at the contents of a scene or change in the scene, algorithms are used to identify selected areas of focus (e.g. objects in motion, objects moving towards the camera, objects of predetermined shapes, sizes, or colors). Based on the outcome of the scene analysis, the steering mechanism guides the light beam to dwell more on the areas of interest in order to improve image quality and/or rendering speed (depending on application type and/or the scene). The use of light steering enables dynamic adjustment of the field of view.

The present application describes computational cameras that are high resolution, operate in real-time, and utilize fully transport-aware optimization models. The proposed systems and methods are based in part on linking parallel trends between light transport rendering capabilities on GPU hardware and transport-aware computational imaging systems. This increases problem sizes in high resolution computational imaging systems, opens a path toward real-time operational requirements in dynamic computational imaging systems, and provides for optimization-based inverse rendering for computational cameras. The techniques described herein also demonstrate adaptive transport-aware optimization in structured light scanning techniques such as motion contrast three-dimensional (3D) scanning.

An imaging system of the present application includes a light source that directs light onto a scene. The light source can be any type of light source known in the art such as a laser, light-emitting diode (LED), etc. The imaging system also includes a light steering mechanism that directs the light source towards an area of interest within the scene, and an image sensor that measures the projected light. In an illustrative embodiment, the imaging system also includes a processor running one or more algorithms to identify areas of interest within the field of view and to direct the light beam towards those areas of interest via the steering mechanism.

Additionally, the present application provides a method for dynamically narrowing the field of view and improving the imaging quality of a particular area within a broader field of view. The method includes the operations of steering or modulating a light source toward a region of interest using a micro-electro-mechanical system (MEMS) device, a galvanometer, a digital micromirror (DMD) device, a spatial light modulator, or other non-discrete modulation device, emitting light from the light source towards the area of interest, receiving the directed light by the imaging system, creating an indirect image of the area of interest from the directed light, and improving image quality of the indirect image in a region of interest by redistributing fixed sensor resolution into the region of interest using a non-discrete modulation device and sampling. In some embodiments, the sampling can be performed using dual photography techniques in which reflected light is sampled by both a camera and projector. In alternative embodiments, the method can include fewer, additional, and/or different operations.

In another embodiment, a proposed method dynamically controls the direction of the light beam and improves the imaging quality or refresh speed of a particular area within a broader field of view. The proposed method can include the operations of processing contents or change in the contents of the field of view to identify areas of interest, steering or modulating a light source toward the identified region of interest using a MEMS device, DMD device, galvanometer, spatial light modulator, optical phased array, or other non-discrete modulation device, emitting light from the light source towards the area of interest, receiving the directed light by the imaging system, and creating an indirect image of the area of interest from the directed light. The method may further include the operation of improving image quality of the indirect image in a region of interest by redistributing fixed sensor resolution into the region of interest using a non-discrete modulation device and sampling using dual photography or other techniques. The method may also include improving imaging speed in area(s) of interest by scanning the beam across it more often, or reducing power consumption through decreased light use when there are few areas of interest within the field of view.

The systems and methods of the present application may be utilized in a variety of applications such as autonomous vehicles, industrial automation, robotic surgery, precision agriculture, defense, warehouse operation, assistive technologies, general photography, etc.

An illustrative system to process images includes a light source configured to emit a first illumination pattern onto one or more first portions of a scene. The system also includes an image sensor configured to capture light reflected from the scene in response to the emitted first illumination pattern. The system also includes an optimizer configured to perform raytracing of the light reflected from the scene. The system further includes a processor operatively coupled to the optimizer. The processor is configured to determine a parameter of a surface of the scene based on the raytracing, cause the light source to emit a second illumination pattern onto one or more second portions of the scene based at least in part on the parameter of the surface, and refine the parameter of the surface of the scene based on additional raytracing performed on reflected light from the second illumination pattern.

An illustrative method of processing images includes emitting, by a light source, a first illumination pattern onto one or more first portions of a scene. The method also includes capturing, by an image sensor, light reflected from the scene in response to the emitted first illumination pattern. The method also includes raytracing, by an optimizer, the light reflected from the scene. The method also includes determining, by a processor operatively coupled to the optimizer, a parameter of a surface of the scene based on the raytracing. The method also includes emitting, by the light source, a second illumination pattern onto one or more second portions of the scene based at least in part on the parameter of the surface. The method further includes refining, by the processor, the parameter of the surface of the scene based on additional raytracing performed on reflected light from the second illumination pattern.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Decades of work in computer graphics has sought to develop efficient rendering algorithms to approximate physically-correct image formation. A precise model for the propagation of light was expressed long ago by Maxwell, but it vastly overgeneralizes from the effect of incoherent, discrete image formation in a digital camera or projector. Consequently, much work in rendering has sought to capture the bare minimum light transport effects necessary to produce intensity images quickly, at high resolution, usually in the form of geometric optics.

Early approximations linearly combine independent specular and diffuse reflectance models for high efficiency to suit the computing resources of the time, and remain in widespread use. More accurate approximations later take into account physical reflectance properties. The balance of energy flowing between any two points in a scene can be expressed as a generalized rendering equation, and can be expressed in an operator notation as follows:

$$f = f_0 + KGf \qquad \text{Eq. 1:}$$

In Equation 1 above, f is radiance in the scene, which is equal to the sum of the incident illumination or emission, $f_0$, and the effect of surface reflectance model K and global illumination (light transport) model G on the radiance. The surface reflectance model K can be parameterized by k, which contains information about albedo or angular distributions. The global illumination model G similarly depends on surface shape s. Light transport in a scene is an inherently recursive processes, as indicated by the radiance term on both sides of Equation 1. In some systems, a Monte-Carlo path tracing method is used for realistic rendering. The steady progression of renderer accuracy has led to many applications, including their use in estimating parameters observed in real world scenes.

A renderer with sufficient physical accuracy can be used as a forward operator in optimization problems to compare the effect of unknown parameters to a real world observation. The known shape-from-shading algorithm is not framed as an inverse rendering problem, but an argument could be made that the notion of matching normal estimates to measurements by solving a set of partial differential equations fits into this category. Parameters to be recovered in the inverse problem may be any or all of illumination $f_0$, surface reflectance k, or surface shape s. This formulation makes it apparent that illumination recovery problems or surface recovery problems can take the same general form with different unknown variables. Inverse rendering problems can be placed into two categories determined by these unknowns, illumination parameters and surface parameters.

Additionally, as discussed below, an inverse raytracing approach can utilize full Monte Carlo path tracing in a volume to model and recover scattering parameters from real-world measurements. Because each Markov chain originating from an output sample is independent from every other chain, Monte Carlo methods are particularly well suited to parallel computation that can be accelerated on a graphical processing unit.

Raytracing with a Graphics Processing Unit

Graphics-specific hardware can be used to accelerate procedures such as rasterizing to framebuffers, polygon-based shading, and texture mapping. The modern Graphics Processing Unit, or GPU, executes programmable shader functions, allowing general purpose computing in a highly parallel environment. This capability allows for hardware accelerated ray tracing, which can accurately recreate a scene, as seen by a conventional camera, in real time. This capability can be used for video games, animations, or any of the inverse rendering techniques mentioned herein. The same GPU accelerated raytracers can be used to simulate entirely different image formation models as well, such as those found in computational imaging systems.

Problem Size in Dynamic Computational Imaging Algorithms

Moving from fixed to content-adaptive sampling patterns gives rise to a significant challenge: the algorithm used to generate the sampling pattern during the capture of a scene must do so fast enough to keep up with the desired frame rate. The spatial resolution of a particular system may in itself be too large for matrix-based linear programming approaches, and this spatial resolution may be multiplexed over time or include multiple cascaded devices that further compound the total number of unknown parameters. Content-adaptive computational imaging systems of the future should be built around an optimization architecture that can conceivably achieve real time operation with realistic advances in hardware power. The methods and systems described herein identify a path toward that capability using a computational imaging camera system.

Motion Contrast 3D Scanning

Motion contrast 3D scanning (MC3D) is a high-speed structured light 3D scanning system that overcomes the bandwidth limitations in conventional scanners by using a distinct sensing approach. Structured light 3D scanning systems are fundamentally constrained by limited sensor bandwidth and light source power, hindering their performance in real-world applications where depth information is essential, such as industrial automation, autonomous transportation, robotic surgery, and entertainment. The proposed technique utilizes motion contrast cameras that sense temporal gradients asynchronously (i.e., independently for each pixel), a property that minimizes redundant sampling. This allows laser scanning resolution with single-shot speed, even in the presence of strong ambient illumination, significant inter-reflections, and highly reflective surfaces. The proposed approach will allow 3D vision systems to be deployed in challenging and hitherto inaccessible real-world scenarios requiring high performance, while using limited power and bandwidth.

A key limitation common to most structured light scanning techniques, including MC3D, is an overly simplistic forward model that only considers direct paths between the projector and camera. This causes significant depth errors in areas with interreflection, subsurface scattering, or another phenomenon not described by single-bounce paths. To overcome these problems, the inventors have proposed extending the forward model to include multi-bounce paths (i.e., to be light transport-aware).

Optimization-Based Inverse Rendering for Computational Cameras

Consumers have driven the development of massively parallel computing devices in the form of GPUs. Originally targeted narrowly to video game enthusiasts, GPUs are now an important general purpose computing tool used by researchers and professionals in industries as varied as machine learning, autonomous navigation, and media production, as well as increasingly widespread consumer use in phones, desktop computers, and console video game systems. The increasing mass-production of both high-bandwidth optoelectronics and massively parallel GPUs lays the hardware groundwork for computational cameras that have the bandwidth and computing power for adaptive, real-time sampling.

Raytraced rendering models can achieve the crucial requirement for this type of system: parallelization of large problem sizes during optimization. Unbiased model estimates can be compiled from many independently processed stochastic samples distributed across GPU compute cores, unlike signal processing approaches. For different physical imaging systems, different raytracer designs can be utilized to efficiently and accurately estimate light transport given system parameters. In general, an imaging system will have a set of parameters defining the illumination incident on the scene in question, whether it be actively controlled or ambient illumination. The system will generally include a series of surfaces defined by their shape and reflectance. These surfaces interact with the incident illumination, whether they be external scene geometry or known internal optics. Finally, a system will have a target to drive the optimization. In the case of a camera, this will be the measurement output of the sensor.

Figure 1:
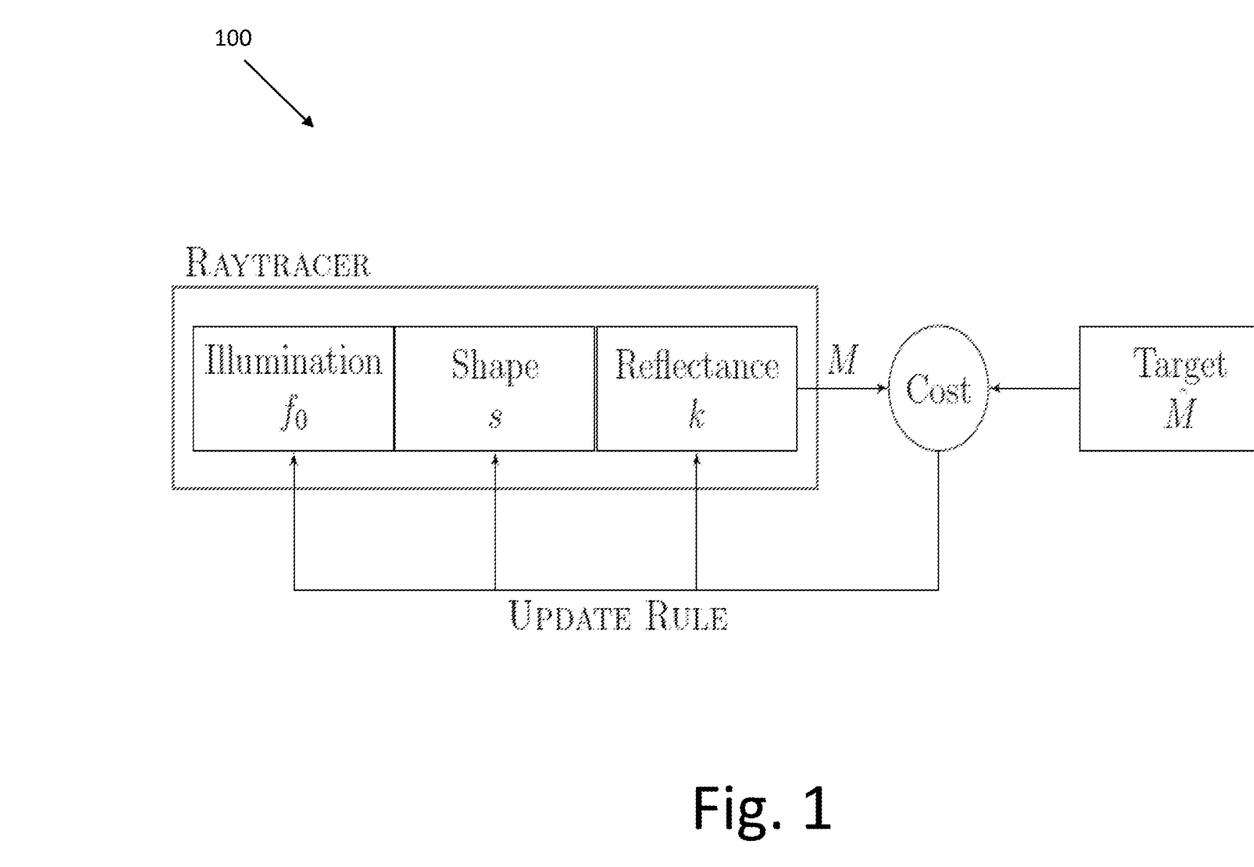
FIG. 1 is a block diagram of an optimizer in accordance with an illustrative embodiment.

FIG. 1 is a block diagram of an optimizer 100 in accordance with an illustrative embodiment. The optimizer 100 determines one or more of illumination pattern $f_0$, surface shape parameters s, and surface reflectance parameters k, which produce raytracer output M that matches target M according to a cost function. Three components, the raytracer, the cost function, and the update rule, comprise the proposed structure for optimization, as shown in FIG. 1. Following Equation 1, the forward model output M will be a stochastically sampled estimate of scene radiance f, including light transport within the scene, as a function of the scene surfaces s, reflectance parameters k and incident illumination $f_0$, which is transformed to the camera sensor by a projection operator $P_c$, as shown in Equation 2 below:

$$M(s,k,f_0)=P_c f(s,k,f_0) \qquad \text{Eq. 2:}$$

The raytracer estimate is assumed to be unbiased, and samples are drawn from a normal distribution with variance $\sigma^2$ and mean equal to the ground truth M*, as shown in Equation 3 below:

$$M:N(M^*,\sigma^2) \qquad \text{Eq. 3:}$$

Consequently, with sufficient samples, M converges to M* as shown in Equation 4 below:

$$\lim_{N \to \infty} \frac{1}{N}\sum_{n=1}^{N} M_n \to M^* \qquad \text{Eq. 4}$$

One can now solve a least squares problem to recover the parameters to M that will match an observation $\hat{M}$, as follows:

$$\|\hat{M}-M(s,k,f_0)\|_2^2 \qquad \text{Eq. 5}$$

Given a target M, the initial illumination $f_0$, surface reflectance parameters k, and surface shape s are passed to the raytracer, which computes the output of the scene. The cost function imposes an error penalty between the desired raytracer output and actual output, which in turn causes the update rule to refine the raytracer input parameters. This iterative process repeats until the cost function satisfies the desired tolerance. The desired tolerance can be controlled by a user, and can be dependent upon the specific application being implemented.

Given the vast body of work in optimizer design, this inverse rendering approach will be able to plug into an off-the-shelf optimization framework best suited for the task at hand. The focal surface implementation described herein uses the conjugate gradient least squares (CGLS) implementation of the LSQR algorithm. This is convenient for two reasons. First, the forward and transpose operators can be passed as function handles, which allows the external raytracer to be called. Second, the algorithm computes gradient descent operations automatically using a finite difference method.

Using the proposed optimization approaches extends the existing depth recovery algorithm in structured light scanning to be light transport aware. As discussed, light transport within the scene can be modeled by a GPU-based (or other processor-based) raytracer that captures interreflection paths. This raytracer model is inserted into a conjugate gradient descent algorithm.

Described in more detail below are the operations used to perform light transport-aware structured light scanning with inverse raytracing. Although motion contrast 3D scanning is used as an example, it is to be understood that the techniques described herein can be applied to any type of structured light scanning system. The previously proposed Motion Contrast 3D Scanning technique estimates 3D surface shape s assuming a trivial transport operator G where only direct light paths are present, and assumes uniform Lambertian reflectance k. Using a path tracer implemented on the GPU to estimate the effect of a physically accurate G, the proposed systems and methods extend the Motion Contrast 3D Scanning technique to be light transport-aware.

The previously implemented direct path disparity algorithm is effective when motion contrast events due to interreflection can be avoided by precisely set event threshold levels. This involves some prior knowledge of expected illumination levels in the scene. Not only does the new transport-aware model avoid this limitation, the interreflection events themselves are used in the reconstruction. This follows the goals of the MC3D concept of bandwidth efficiency where the camera's sampling function is matched to that of the projector (a series of sequential discrete points), but now additional information from interreflections is no longer culled, and thus no longer under-sampled.

The optimization has the following objective function:

$$\min_s \|\hat{M} - M(s, k, f_0)\|_2^2 \qquad \text{Eq. 6}$$

In this case, $\hat{M}$ contains the space-time disparity between motion contrast events and projected pixels. The projection operator $P_c$ (described in Equation 2) performs thresholding, serialization, and disparity calculation in addition to lens projection. Since this camera is scanning real-world scenes, one can improve performance by adding a total-variation sparsity prior to the objective, as shown in Equation 7 below:

$$\min_s \|\hat{M} - M(s, k, f_0)\|_2^2 + \lambda \|s\|_{TV} <= \varepsilon \qquad \text{Eq. 7}$$

Figure 2:
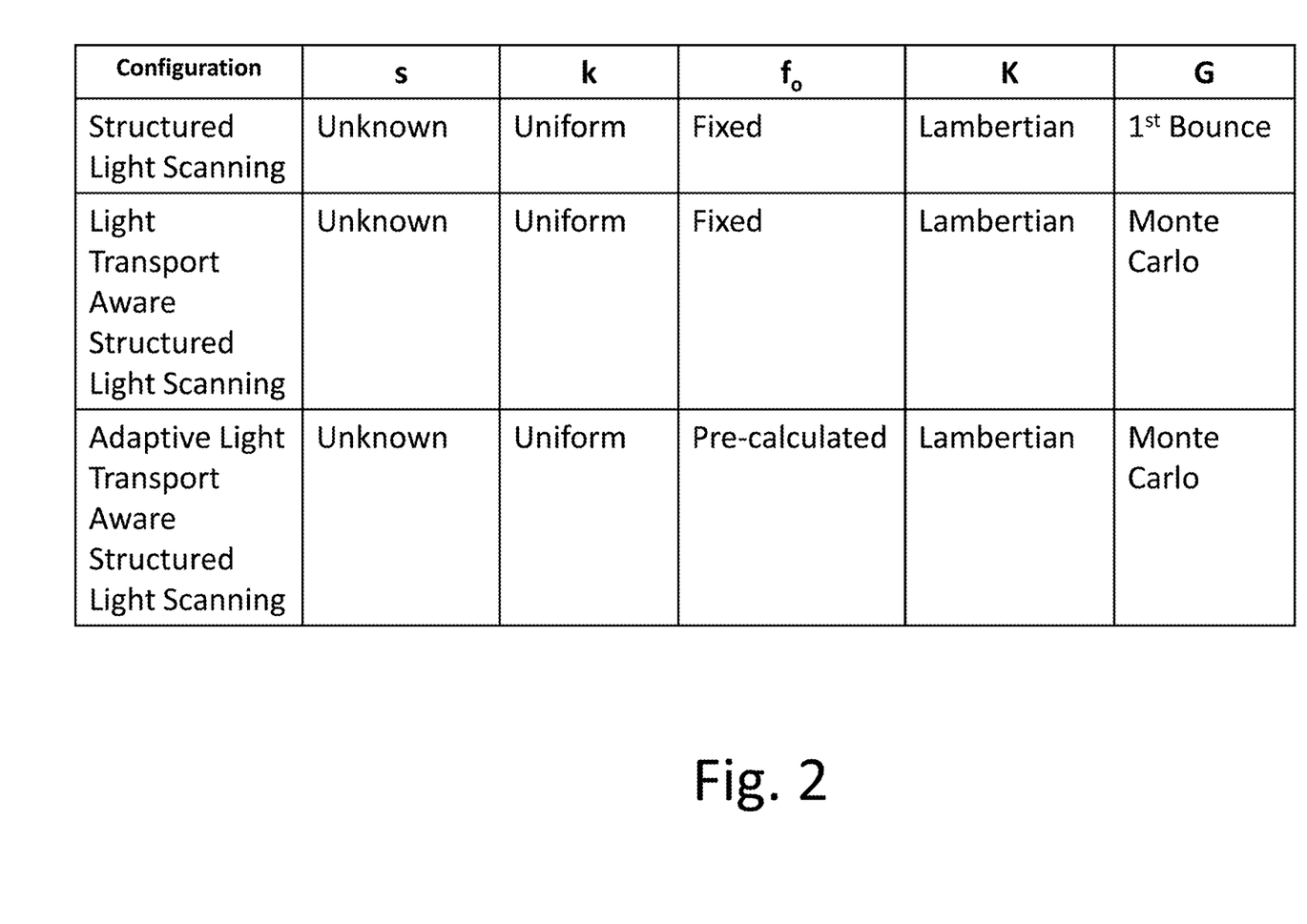
FIG. 2 is a table that that depicts the progression from structured light scanning, to light transport aware structured light scanning, to adaptive light transport aware structured light scanning in accordance with an illustrative embodiment.

The illumination pattern for structured light scanning (e.g., MC3D and light transport aware MC3D) has been assumed to be a fixed raster scan. FIG. 2 is a table that that depicts the progression from structured light scanning, to light transport aware structured light scanning, to adaptive light transport aware structured light scanning in accordance with an illustrative embodiment. In the table of FIG. 2, each version applies a different approach to the incident illumination $f_0$ and the light transport model G.

As shown in FIG. 2, different systems will have different values for surface shape s, reflectance k, illumination $f_0$, as well as reflectance model K and light transport model G from Equation 1. As shown, the original structured light scanning formulation uses a fixed lighting term (a raster scan) and ignores light transport within the scene entirely with a single-bounce Lambertian assumption. The light transport-aware extension to structured light scanning includes raytraced estimates of light transport to recover the surface shape. Adaptive light transport aware structured light scanning pre-calculates a lighting pattern prior to sampling.

Figure 3:
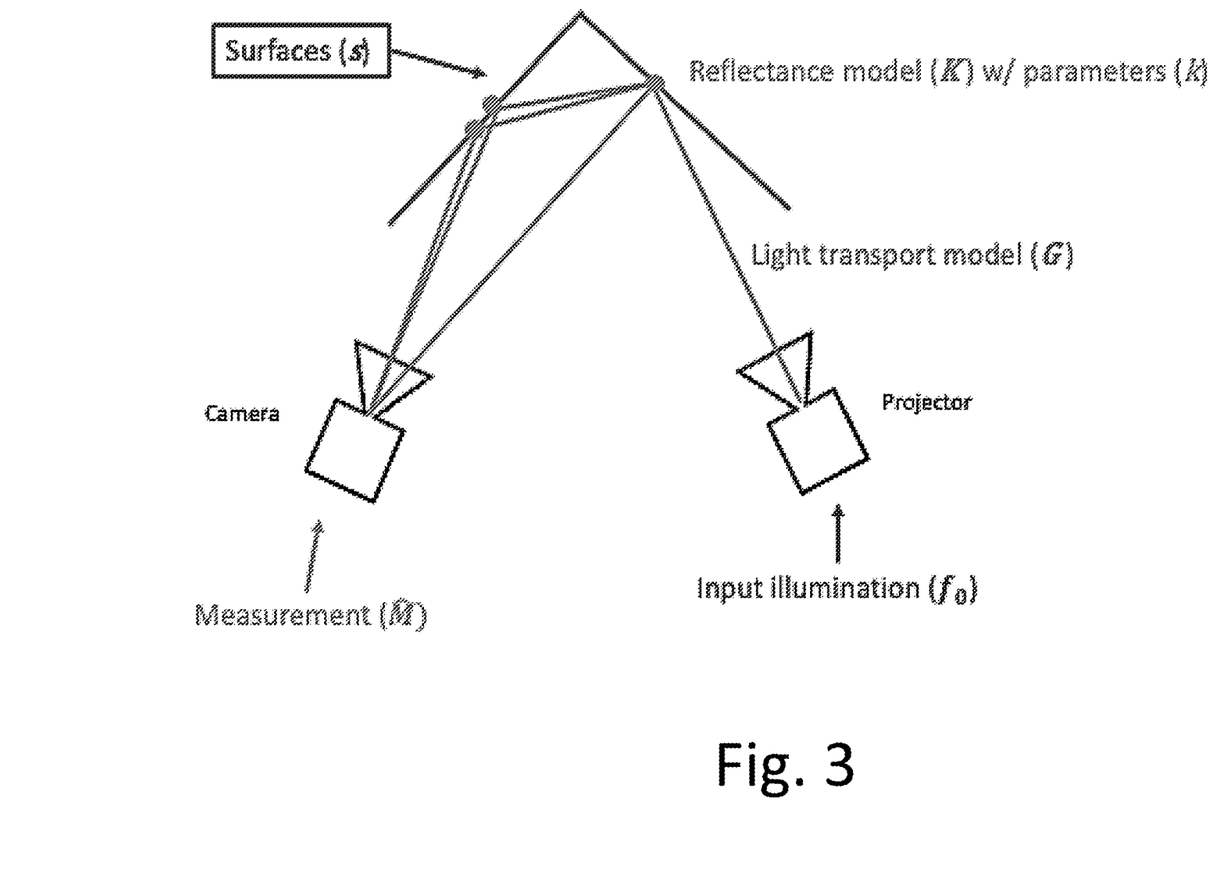
FIG. 3 is a diagram that depicts the interaction of known and unknown variables in a motion contrast 3D scanning system in accordance with an illustrative embodiment.

FIG. 3 is a diagram that depicts the interaction of known and unknown variables in a motion contrast 3D scanning system in accordance with an illustrative embodiment. The system includes a projector that provides an input illumination having a known time varying illumination pattern $f_0$. The projector can include any type of light source, and use any type of illumination pattern, such as raster scan, etc. The light transport model (G) is also known (e.g., path trace). The light reflects one or more times off surfaces (s), which are unknown. The reflection occurs in accordance with a known reflectance model (K) (e.g., Lambertian) having known parameters (k). The reflected light is received by a sensor of a camera and measured as the known value $\hat{M}$. For structured light scanning, a goal is to match the raytracer output to the measurement $\hat{M}$, which takes as arguments a surface shape estimate s, and fixed Lambertian reflectance k. Together, s and k define the light transport within the scene.

In an illustrative embodiment, the illumination pattern $f_0$ can be improved upon by using dynamic sampling. A standard MEMS/galvanometer, or single scanned micromirror, can be replaced by a digital micromirror device (DMD). The DMD enables random access illumination. By replacing the MEMS with a DMD, the system is able to randomly address illumination pixels at rates into the tens of kilohertz such that dynamic sampling can be performed.

A clear use case for pre-calculated illumination in structured light scanning is adaptive refinement. Given a fixed time budget per acquisition, and the projector frame rate and resolution, at most N pixels can be illuminated sequentially. A fixed raster scan would select N pixels that span the scene uniformly. This is also a reasonable initial illumination pattern for adaptive refinement. In the next acquisition, instead of repeating the same fixed raster pattern, a new set of points can be selected based on areas where the current depth estimate has higher spatial frequencies. Furthermore, to ensure a minimum level of sampling and ensure convergence, new points can also be selected in areas not previously sampled.

To do so, N pixel positions $(X_1 \ldots X_n)$ are selected for frame t from a distribution designed to improve the surface estimate after each acquisition. The distribution contains terms for the magnitude of the gradient and curvature of surface estimate s, weighted by parameters $\alpha$ and $\beta$, and projected to the projector reference plane by $P_p$. The distribution also contains the complement of the sum of all previous illumination pattern $f_{0(t-1)}$ weighted by $\gamma$ to bias new measurements toward under-sampled areas. This is shown in Equation 8 below:

$$P(X_i) = \alpha |P_p \nabla s| + \beta |P \nabla^2 s| + \gamma \left(1 - \frac{1}{t-1} \sum_{j=0}^{t-1} f_{0j}\right) i \in \{1, 2, \ldots N\} \quad \text{Eq. 8}$$

Equation 8 enables the system to prioritize areas of a surface with high slope and/or curvature and the fewest samples given a sample budget N, for denser sampling. This is done by building a desired sampling density over the scene. In Equation 8 above, the magnitude of the gradient is represented by the alpha term and curvature of the current surface estimate is represented by the beta term, from the point of view of the projector ($P_p$ denotes the projector sampling operator). The gamma term is the compliment to the sum of all previous sampling patterns. The system is then able to pick N pixels from this sampling density using rejection sampling.

Figure 4A:
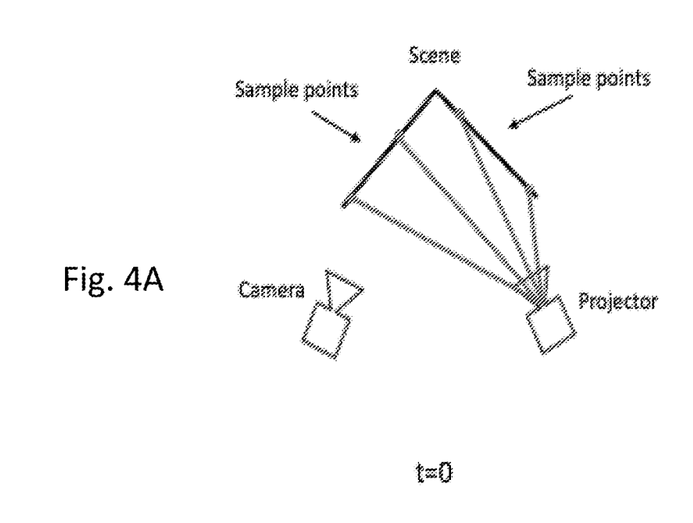
FIG. 4A depicts use of a fixed sampling budget at time t=0 in accordance with an illustrative embodiment.
Figure 4B:
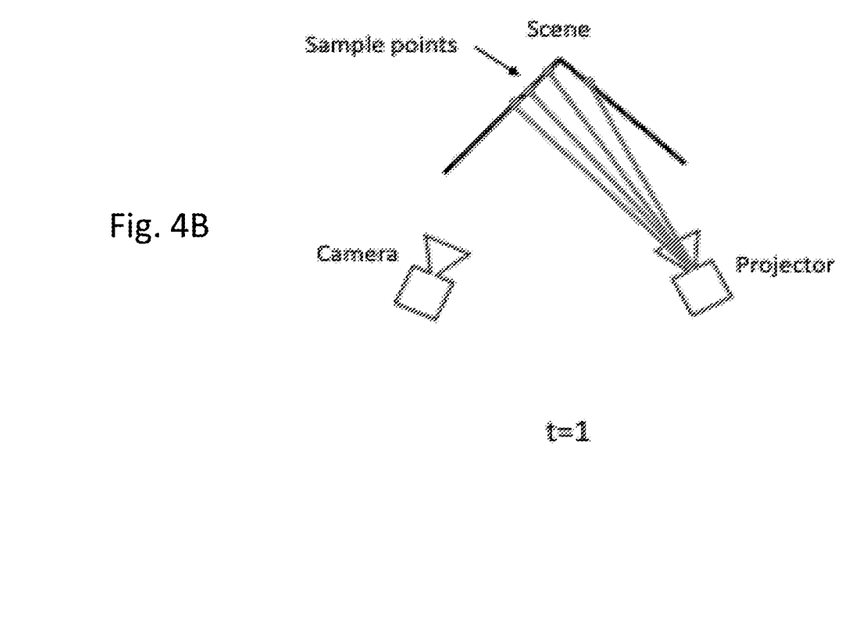
FIG. 4B depicts use of a fixed sampling budget at time t=1 in accordance with an illustrative embodiment.
Figure 4C:
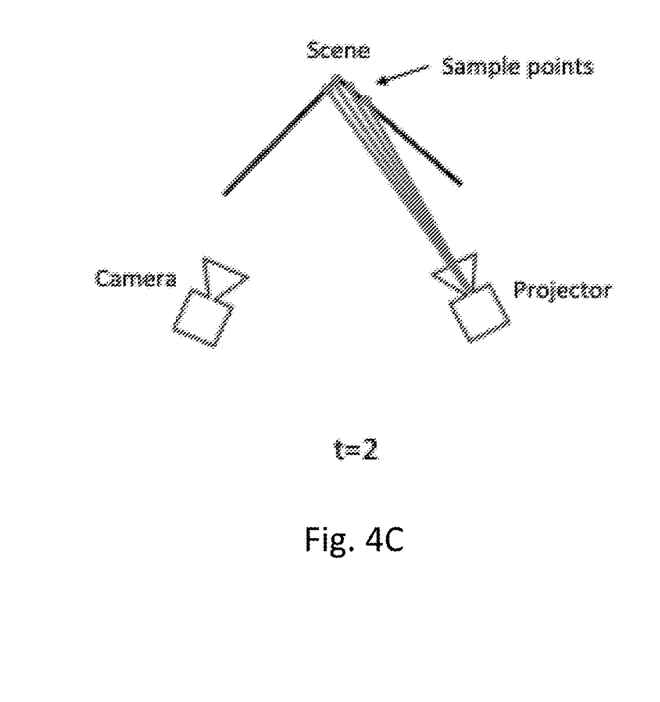
FIG. 4C depicts use of a fixed sampling budget at time t=2 in accordance with an illustrative embodiment.

FIG. 4A depicts use of a fixed sampling budget at time t=0 in accordance with an illustrative embodiment. FIG. 4B depicts use of a fixed sampling budget at time t=1 in accordance with an illustrative embodiment. FIG. 4C depicts use of a fixed sampling budget at time t=2 in accordance with an illustrative embodiment. In the embodiment of FIG. 4, the fixed sampling budget N=4, although in other scenarios a much larger sampling budget may be used. As depicted, four illumination patterns are emitted by a projector onto a scene, and the points of contact with the scene are depicted as sample points. In the first acquisition of FIG. 4A (t=0), the sample points are spread evenly over the scene. In the subsequent acquisitions, existing measurements are utilized to resample a prioritized area of the scene for which more detail is needed. Thus, in FIG. 4C at t=2 it can be seen that the samples are focused on the sharp transition area within the scene based on the information obtained at t=0 and t=1. While only 3 time frames are shown in FIG. 4, it is to be understood that additional time frames may be used in real world scenarios.

In one embodiment, adaptive illumination can be performed by extending point scanning techniques to structured 3D light acquisition. Using such a technique, entropy can be reduced over time by selecting pixels with the greatest posterior variance for each sample. As an example, posterior variance can be computed for each pixel location x using obtained samples. The pixel location with the largest posterior variance is identified, and that pixel location is measured (e.g., using an index block surrounding the pixel of interest). Based on the index blocks, sample vectors can be generated from block posterior density using a Hastings Metropolis sampler. Each index block can then be replaced by a sample vector to form the pixel location x.

Figure 5:
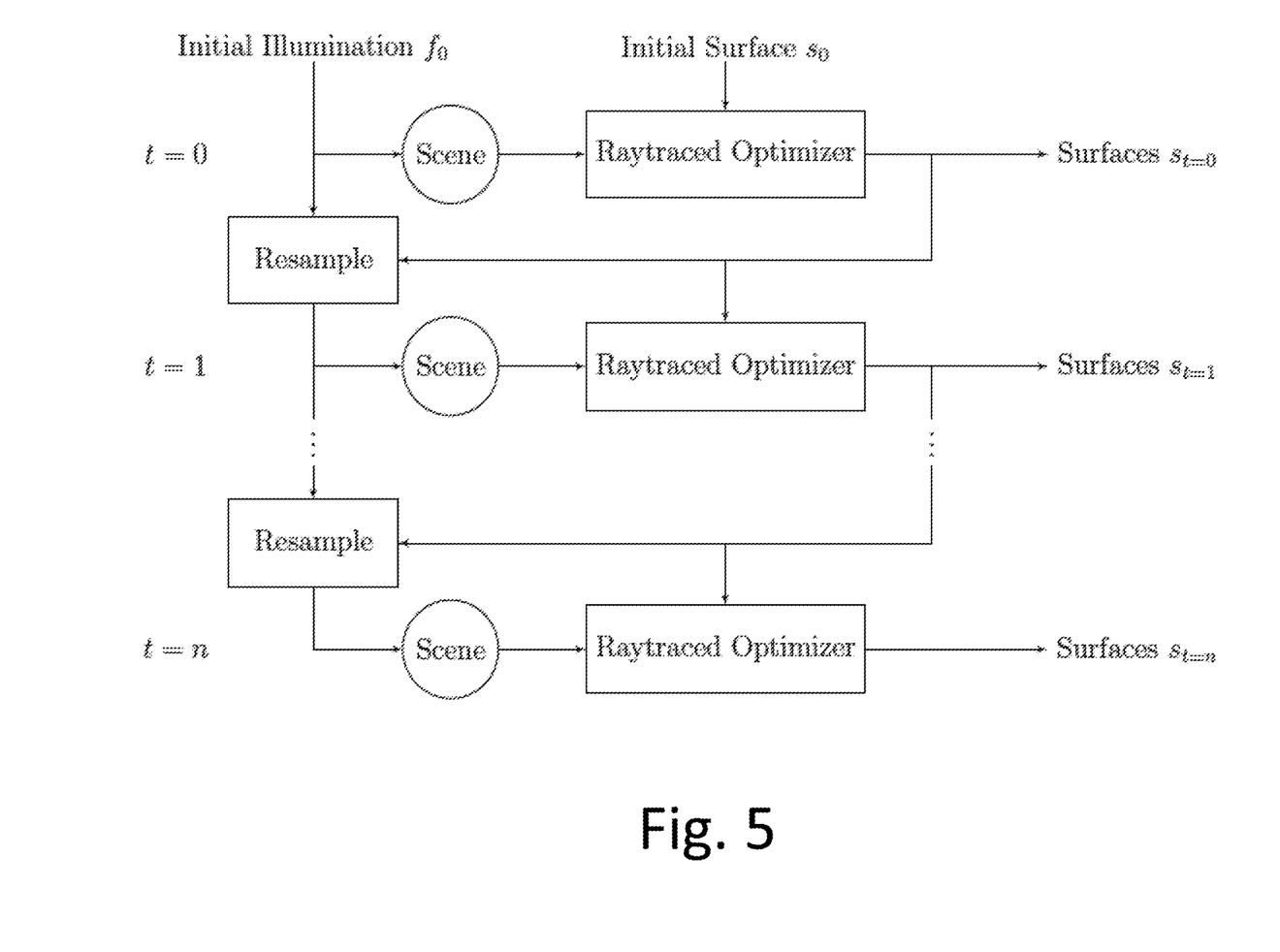
FIG. 5 depicts the interaction between measurement, surface estimation, and illumination pattern selection over time in a system performing adaptive motion contrast 3D scanning in accordance with an illustrative embodiment.

FIG. 5 depicts the interaction between measurement, surface estimation, and illumination pattern selection over time in a system performing adaptive motion contrast 3D scanning in accordance with an illustrative embodiment. As shown in FIG. 5, an initial illumination pattern $f_0$ is projected onto the scene, with points being distributed evenly over the scene. The sensor measures the scene response at time zero, which is used as input to the raytraced optimizer. The optimizer produces a surface estimate $s_t=0$, then draws a refined illumination pattern from a distribution based on the surface estimate and previous illumination pattern. Specifically, based on the initial illumination pattern and areas with high local variance in the surface, a new illumination pattern is selected. The new pattern is displayed by the projector and the process repeats, successively refining the surface estimate and illumination pattern field of view with each run of the optimizer. The surface estimate at each stage is used to initialize the subsequent optimization. The surface estimate can also be the basis for the system to decrease activation of the light source to reduce power consumption of the system. Specifically, if the system determines that there few (or no) areas of interest within the field of view, scanning within that field of view is decreased or stopped to conserve power.

Figure 6:
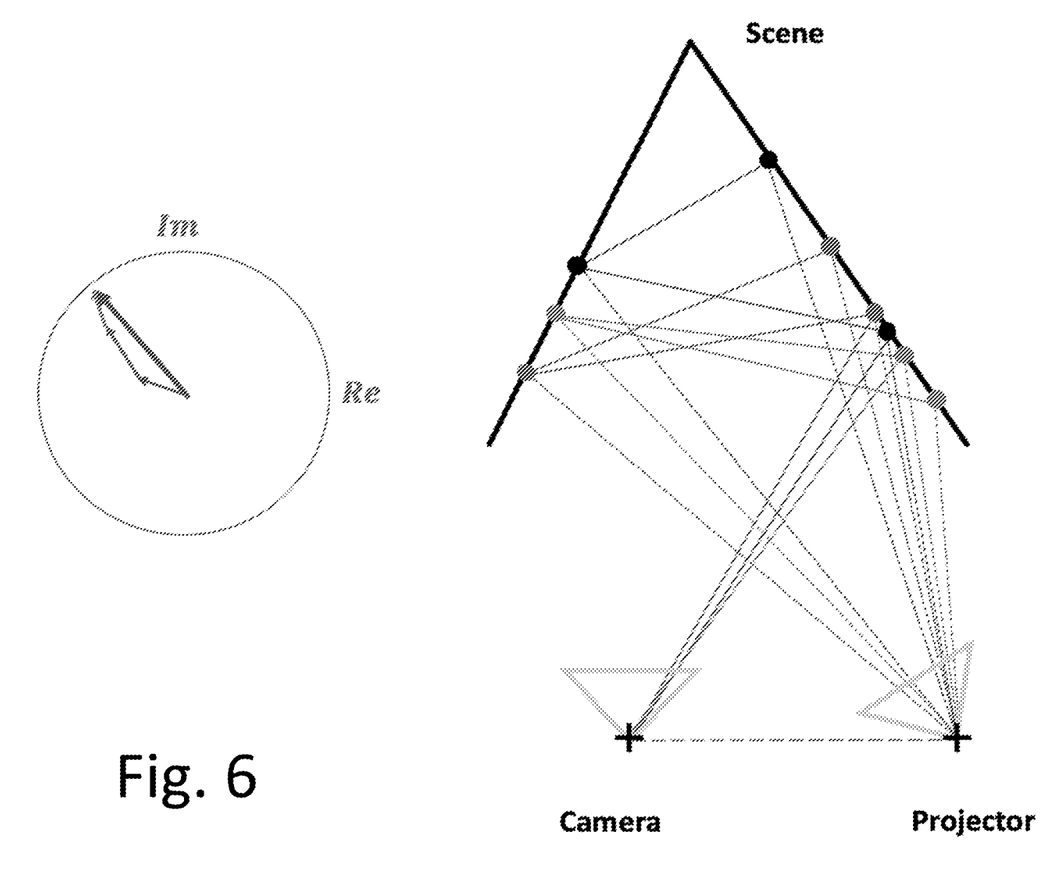
FIG. 6 depicts reflections for a phase shift forward model or a time of flight forward model in accordance with an illustrative embodiment.
Figure 7:
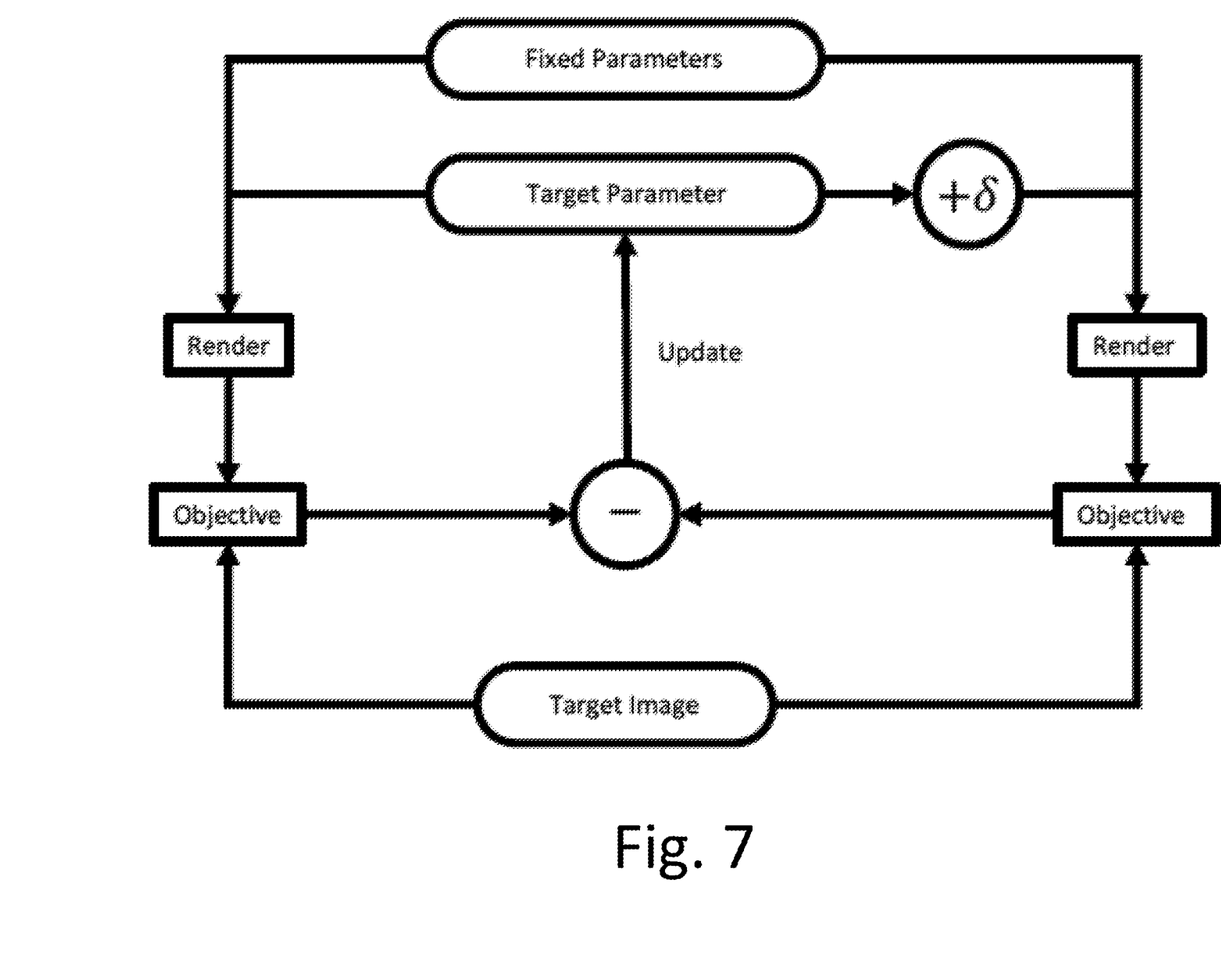
FIG. 7 depicts an optimization block diagram for a rendering based forward model in accordance with an illustrative embodiment.

FIG. 6 depicts reflections for a phase shift forward model or a time of flight forward model in accordance with an illustrative embodiment. The phase shift forward model is described first, followed by the time of flight (ToF) forward model. FIG. 7 depicts an optimization block diagram for a rendering based forward model in accordance with an illustrative embodiment. As shown, a rendering-based forward model can be used in gradient descent optimization even when an analytical derivative or adjoint operator are not available for the target parameters. In these situations a finite difference approach can be applied, where each target parameter is offset in the scene and then re-rendered to produce a gradient image with respect to that parameter. The parameter is then updated to incrementally minimize the objective function. This finite difference process is further explained with reference to Equation 9, below:

$$\frac{\partial I}{\partial \Gamma} \approx \frac{T(I + \delta_\Gamma) - T(I)}{\delta_\Gamma} \quad \text{Eq. 9}$$

In Equation 9 above, I is a sharp image intensity vector, T is a light transport matrix, and $\delta_\Gamma$ is an offset in parameter $\Gamma$. Using Equation 9, finite difference approximations to partial derivatives are calculated for each parameter $\Gamma$ in the optimization. The partial derivatives can then be used to update I.

For structured light, the value of a ray exiting the projector can contain the coded pixel position originating the ray. In the case of sinusoidal projector patterns, a phasor can be propagated through the scene. The emission intensity $I_e$ becomes $\bar{I}_e$, the emitted complex phasor. The phase of the phasor to be projected is calculated using the pixel projection of the path endpoint onto the projector using projection matrix $P_p$, as follows:

$$\bar{I}_e(s_d \to s_{d-1}) = e^{i\frac{2\pi}{\lambda} P_p s_x} \quad \text{Eq. 10}$$

In Equation 10, $\lambda$ is the period of the spatial encoding pattern in pixels. In the case of a projector-camera system whose baseline is parallel with the x-axis, the column component of $\bar{I}_e$ has to be propagated through the scene. This phasor can be passed through a Monte Carlo estimation for path $\bar{P}$ (now complex in value) in place of the emission term.

Since a single point light source (e.g., projector) is being used, the emitter PDF $p_A(s_d)$ becomes unity. An equation for path $\bar{P}$ is shown below:

$$\bar{P} = \bar{I}_e(s_d \to s_{d-1}) \rho(s_d \to s_{d-1} \to s_{d-2}) G(s_d \leftrightarrow s_{d-1}) \times \beta \qquad \text{Eq. 11}$$

The raytracer initates N samples from each camera pixel. If the structured light technique being modeled involves thresholding, such as intensity thresholding in Gray coding or temporal contrast thresholding in MC3D, then the weight of each accumulated sub-path output is passed through a thresholding operator τ, which omits the current path if the throughput (or change in throughput in the case of MC3D) is below the threshold. Each of these initiates the iterative path integral estimation described above, iterating until maximum depth D is reached. The phasor observation for the current pixel $\bar{I}_{x,y}$, is the accumulation of all N phasors contained in the sample paths, as shown in Equation 12 below.

$$\bar{I}_{x,y} = \frac{1}{N} \sum_{n=1}^{N} \frac{1}{D} \sum_{d=1}^{D} \tau(\bar{P}_{x,y}) \qquad \text{Eq. 12}$$

The angle of this phasor is now the measurement estimate for the phase angle in the projector frame. The projector column C can be recovered for camera pixel (x,y) with the inverse projector projection matrix $P_p^{-1}$, as follows:

$$C_{x,y} = P_p^{-1} \angle \bar{I}_{x,y} \qquad \text{Eq. 13}$$

As noted above with reference to FIG. 6, a time of flight (ToF) forward model can also be used. While structured light illumination is spatially coded, but not time resolved, ToF measurements are not spatially coded but are modulated over time. ToF systems can be generalized to a phasor imaging model. When using a phasor representation the high frequency time dependence of the illumination can be simplified to a steady-state phase measurement, which in turn allows conventional light transport analysis. The path tracing approach can again be used, with the assumption of unity emission, and the throughput and length of each path accumulated as follows:

$$p^{throughput} = \qquad \text{Eq. 14}$$
$$\rho(s_d \to s_{d-1} \to s_{d-2}) G(s_d \leftrightarrow s_{d-1}) \times \left( \prod_{j=1}^{d-2} \frac{\rho(s_{j+1} \to s_j \to s_{j-1}) |\cos\theta_j|}{\rho_w(s_{j+1} - s_j)} \right)$$

$$P^{length} = \Sigma_{j=1}^{d} \|s_j - s_{j-1}\|_2 \qquad \text{Eq. 15:}$$

The contribution of each path to a measurement is still weighted in the conventional manner, but the phasor associated with the path length, given a modulation wavelength λ, is summed instead of the value, as follows:

$$\bar{I}_{x,y} = \sum_{n=1}^{N} \sum_{d=1}^{D} P_{x,y}^{throughput} e^{i \frac{2\pi}{\lambda} P_{x,y}^{length}} \qquad \text{Eq. 16}$$

The phase of this accumulated complex value now can be converted to a distance estimate using the modulation wavelength. In the case of multi-wavelength modulation, each traced path can be modulated by that wavelength prior to phasor accumulation to avoid multiple renders. With multiple frequencies the effective unambiguous range of the measurement can be increased using a phase unwrapping technique. Since an estimate of phasor image including the effect of multi-bounce interference can be produced, the renderer can be included in an optimization problem as described herein.

Figure 8:
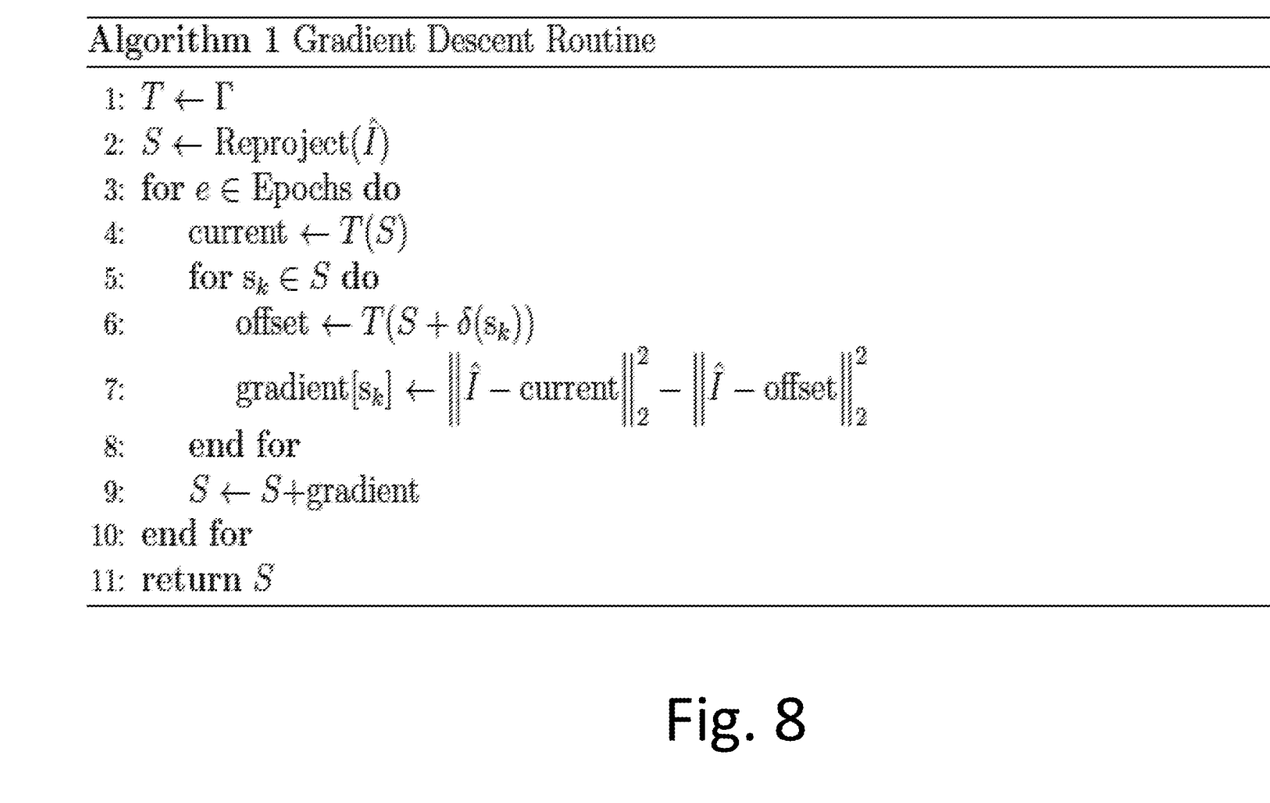
FIG. 8 depicts an algorithm for a gradient descent optimizing routine in accordance with an illustrative embodiment.

FIG. 8 depicts an algorithm for a gradient descent optimizing routine in accordance with an illustrative embodiment. In alternative embodiments, a different optimizer routine may be used. As discussed herein, attributes of the surface can be stored as an offset array. As a result, the update rule used in the optimizing routine can be the current surface array plus the scaled gradient, as depicted in Equations 17-20 below:

Objective Function: $E = \|\hat{I} - T_\Gamma(S)\|_2^2$ \qquad Eq. 17

Objective Gradient: $\nabla E = \left[ \frac{\partial E}{\partial s_1}, \frac{\partial E}{\partial s_2}, \ldots, \frac{\partial E}{\partial s_k} \right] s_k \in S$ \qquad Eq. 18

Finite Difference Approx.: $\frac{\partial E}{\partial s_k} \approx$ \qquad Eq. 19

$$\frac{1}{\partial} \left( \|\hat{I} - T_\Gamma(S)\|_2^2 - \|\hat{I} - T_\Gamma(S + \delta(s_k))\|_2^2 \right)$$

Update Rule: $S' = S + \lambda \nabla E$ \qquad Eq. 20

Figure 9:
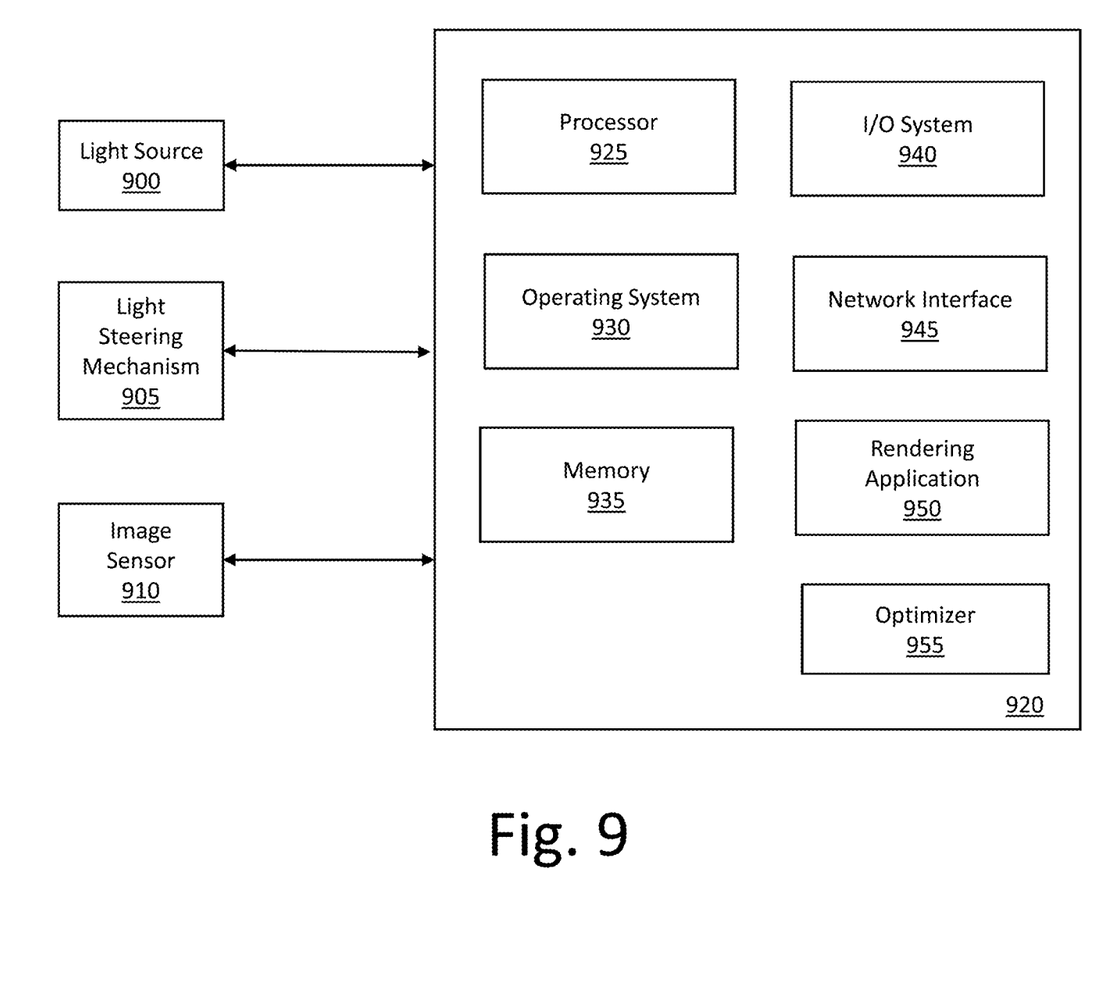
FIG. 9 is a block diagram of a rendering system in accordance with an illustrative embodiment.

FIG. 9 is a block diagram of a rendering system in accordance with an illustrative embodiment. The system includes a light source 900, which can be any type of light source that can be modulated, such as a laser, a DMD, a light-emitting diode, a pulsed light source, radar, etc. The light source is used to illuminate a scene. The system also includes a light steering mechanism 905 that is used to direct and redirect the light source at desired location(s) within the scene. The light steering mechanism 905 can include one or more lenses, one or more mirrors, one or more computer chips, one or more masks, one or more modulators, etc. The system also includes an image sensor 910 used to capture reflected light such that an image can be formed. The image sensor 910 can be part of a camera or any other sensing device.

The light source 900, light steering mechanism 905, and image sensor 910 are all in communication with a computing device 920. The communication can be direct, or indirect via a network. In some embodiments, one or more of the light source 900, light steering mechanism 905, and image sensor 910 can be incorporated into the computing device 920 as part of an imaging system.

The computing device 920 includes a processor 925, an operating system 930, a memory 935, an input/output (I/O) system 940, a network interface 945, a rendering application 950, and an optimizer 955. In alternative embodiments, the computing device 920 may include fewer, additional, and/or different components. The components of the computing device 920 communicate with one another via one or more buses or any other interconnect system. The computing device 920 can be any type of networked computing device such as a laptop computer, desktop computer, smart phone, camera system, projector system, tablet, gaming device, workstation, server, music player device, etc.

The processor 925 can included a graphics processing unit and/or a standard processing unit. The processor 925 can be used to perform any of the calculations described herein and/or to run any of the algorithms or operations described herein. In one embodiment, the processor 925 of the system is configured to issue one or more electronic commands to control the light source 900, the light steering mechanism 905, and/or the image sensor 910. The processor 925 can be any type of computer processor known in the art, and can include a plurality of processors and/or a plurality of processing cores. The processor 925 can include a controller, a microcontroller, an audio processor, a graphics processing unit, a hardware accelerator, a digital signal processor, etc. Additionally, the processor 925 may be implemented as a complex instruction set computer processor, a reduced instruction set computer processor, an x86 instruction set computer processor, etc. The processor 925 is used to run the operating system 930, which can be any type of operating system.

The operating system 930 is stored in the memory 935, which is also used to store programs, user data, network and communications data, peripheral component data, the rendering application 950, the optimizer 955, and other operating instructions. The memory 935 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 940 is the framework which enables users and peripheral devices to interact with the computing device 920. The I/O system 940 can include a mouse, a keyboard, one or more displays, a speaker, a microphone, etc. that allow the user to interact with and control the computing device 920. The I/O system 940 also includes circuitry and a bus structure to interface with peripheral computing devices such as power sources, USB devices, data acquisition cards, peripheral component interconnect express (PCIe) devices, serial advanced technology attachment (SATA) devices, high definition multimedia interface (HDMI) devices, proprietary connection devices, etc.

The network interface 945 includes transceiver circuitry that allows the computing device to transmit and receive data to/from other devices such as remote computing systems, servers, websites, etc. The network interface 945 enables communication through a network, which can be one or more communication networks. The network can include a cable network, a fiber network, a cellular network, a wi-fi network, a landline telephone network, a microwave network, a satellite network, etc. The network interface 945 also includes circuitry to allow device-to-device communication such as Bluetooth® communication.

The computing device 920 further includes the rendering application 955, which is used for rendering, and the optimizer 955 that is used to perform raytracing in an effort to match information sensed by the image sensor 910 with the light emitted from the light source 900 as discussed herein. The rendering application 950 and the optimizer 955 can include software in the form of computer-readable instructions which, upon execution by the processor 925, performs any of the various operations described herein such as image capturing, light steering, optimizing by raytracing, rendering, etc. In some embodiments, the rendering application 950 and/or optimizer 955 can utilize the processor 925 and/or the memory 935 as discussed above to control any of the light source 900, the light steering mechanism 905, and the image sensor 910. In an alternative implementation, the rendering application 950 and/or optimizer 955 can be remote or independent from the computing device 920, but in communication therewith.

As discussed above, in an illustrative embodiment, any of the apparatuses or systems described herein can include and/or be in communication with a computing system that includes, a memory, processor, user interface, transceiver, and any other computing components. Any of the operations described herein may be performed by the computing system. The operations can be stored as computer-readable instructions on a computer-readable medium such as the computer memory. Upon execution by the processor, the computer-readable instructions are executed as described herein.

Described herein are the computational challenges in implementing high-resolution, real-time transport-aware computational cameras due to large problem sizes and processing time limits. As shown, inverse-raytracing on a GPU may be used to overcome these challenges because of the GPUs ability to scale distributable path tracing computation to very large problems at high speed. Specifically, an optimization algorithm to implement an adaptive, light transport-aware extension in structured light scanning is provided herein. The optimization-based inverse rendering approach is an avenue for computational cameras that are higher resolution, higher speed, and can capture or recreate increasingly complex optical phenomena. These will in turn enable devices to operate in new environments, give users new visual experiences, and become crucial measurement tools in science and industry.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system to process images comprises:
   a light source configured to emit a first illumination pattern onto one or more first portions of a scene;
   an image sensor configured to capture light reflected from the scene in response to the emitted first illumination pattern;
   an optimizer configured to perform raytracing of the light reflected from the scene; and
   a processor operatively coupled to the optimizer, wherein the processor is configured to:
   determine a surface estimate of a surface of the scene based on the raytracing;
   cause the light source to emit a second illumination pattern onto one or more second portions of the scene, wherein the second illumination pattern is determined based on a magnitude of a gradient of the surface estimate and a magnitude of a curvature of the surface estimate; and refine the surface estimate parameter of the surface of the scene based on additional raytracing performed on reflected light from the second illumination pattern.

2. The system of claim 1, wherein the raytracing traces direct paths and multi-bounce paths of the light reflected from the scene.

3. The system of claim 1, wherein, based at least in part on a parameter of the surface of the scene, the processor is configured to decrease activation of the light source to reduce power consumption of the system.

4. The system of claim 1, wherein the processor determines that the one or more second portions of the scene have a depth estimate with higher spatial frequencies than the one or more first portions of the scene.

5. The system of claim 1, wherein the one or more second portions of the scene are previously unsampled portions of the scene.

6. The system of claim 1, wherein the second illumination pattern is calculated based at least in part on the first illumination pattern.

7. The system of claim 1, further comprising a light steering mechanism, wherein the processor directs the light source onto the one or more second portions of the scene using the light steering mechanism.

8. The system of claim 1, wherein the processor comprises a graphics processing unit (GPU).

9. The system of claim 1, wherein the optimizer is configured to generate an output based on the raytracing of the light reflected from the scene, wherein the output comprises an estimate of scene radiance.

10. The system of claim 9, wherein the processor is configured to determine whether the output of the optimizer matches a target output, wherein the target output is based on the first illumination pattern.

11. The system of claim 10, wherein the processor uses a cost function to impose an error penalty based on a difference from the output of the optimizer and target output.

12. The system of claim 11, wherein the processor uses an update rule to refine input parameters to the optimizer for the additional raytracing of the reflected light resulting from the second illumination pattern, wherein the update rule is based on the error penalty.

13. A method of processing images, the method comprising:
    emitting, by a light source, a first illumination pattern onto one or more first portions of a scene;
    capturing, by an image sensor, light reflected from the scene in response to the emitted first illumination pattern;
    raytracing, by an optimizer, the light reflected from the scene;
    determining, by a processor operatively coupled to the optimizer, a surface estimate of a surface of the scene based on the raytracing;
    emitting, by the light source, a second illumination pattern onto one or more second portions of the scene based at least in part on the surface estimate of the surface, wherein the second illumination pattern is determined based on a magnitude of a gradient of the surface estimate and a magnitude of a curvature of the surface estimate; and
    refining, by the processor, the surface estimate of the surface of the scene based on additional raytracing performed on reflected light from the second illumination pattern.

14. The method of claim 13, wherein the raytracing comprises tracing direct paths of the light reflected from the scene and tracing multi-bounce paths of the light reflected from the scene.

15. The method of claim 13, further comprising determining, by the processor and based at least in part on the raytracing, that the one or more second portions of the scene have a depth estimate with higher spatial frequencies than the one or more first portions of the scene.

16. The method of claim 13, further comprising calculating, by the processor, the second illumination pattern based at least in part on the first illumination pattern and at least in part on the surface estimate of the surface.

17. The method of claim 13, further comprising steering, by a light steering mechanism, the light source onto the one or more second portions of the scene.

18. The method of claim 13, further comprising:
    generating, by the optimizer, an output based on the raytracing of the light reflected from the scene, wherein the output comprises an estimate of scene radiance; and
    determining, by the processor, whether the output matches a target output based on the first illumination pattern.

* * * * *